United States Patent [19]

Depew et al.

[11] Patent Number: 4,716,554

[45] Date of Patent: Dec. 29, 1987

[54] TAPERED WIRING HARNESS

[75] Inventors: Donald R. Depew, Jackson; Robert A. Houghton, East Lansing; David C. Sparks, Lansing, all of Mich.

[73] Assignee: Sparton Corporation, Jackson, Mich.

[21] Appl. No.: 729,812

[22] Filed: May 2, 1985

[51] Int. Cl.[4] .......... G01V 1/38

[52] U.S. Cl. .......... 367/20; 367/154

[58] Field of Search .......... 367/5, 15, 20, 153, 367/154; 114/243; 174/72 A, 72 TR

[56] References Cited

U.S. PATENT DOCUMENTS

| | | | |
|---|---|---|---|
| 3,984,622 | 10/1976 | Ross | 174/72 A |
| 4,159,394 | 6/1979 | Ross | 174/72 TR |
| 4,241,427 | 12/1980 | Swenson | 367/154 |
| 4,491,939 | 1/1985 | Carpenter | 367/154 |

FOREIGN PATENT DOCUMENTS

| | | |
|---|---|---|
| 2012852 | 1/1971 | Fed. Rep. of Germany . |

*Primary Examiner*—Thomas H. Tarcza

*Assistant Examiner*—Ian J. Lobo

*Attorney, Agent, or Firm*—Reising, Ethington, Barnard, Perry & Milton

[57] ABSTRACT

A tapered wiring harness is disclosed for an array of hydrophones with spaced take-out points on the harness at which a signal wire and a ground wire are connected with a hydrophone. The harness comprises a bundle of signal wires, which diminish in number from one end to the other, and it also comprises a ground wire and a strain cord, which extend throughout the length of the harness. The bundle of wires and the strain cord are held in a bundle of substantially circular cross-section by a lacing of thread formed as a sewing machine stitch of the zig zag type. Hairing members of uniform length are secured to the bundle under the lacing at predetermined intervals with the hairing more closely spaced on the larger diameter of the bundle. In another embodiment, the hairing members are spaced uniformly but are of variable length with longer members on the larger diameter of the bundle.

10 Claims, 5 Drawing Figures

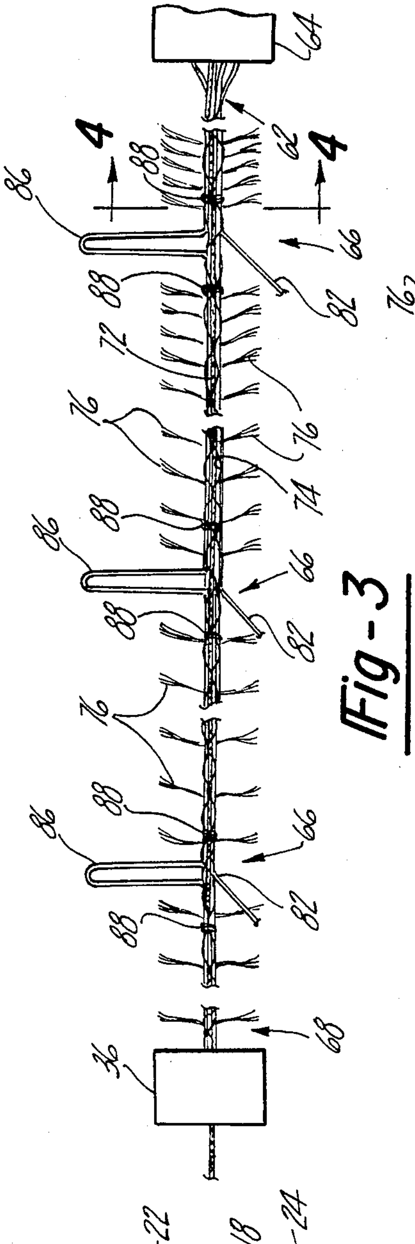
Fig-3
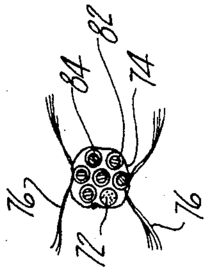
Fig-4
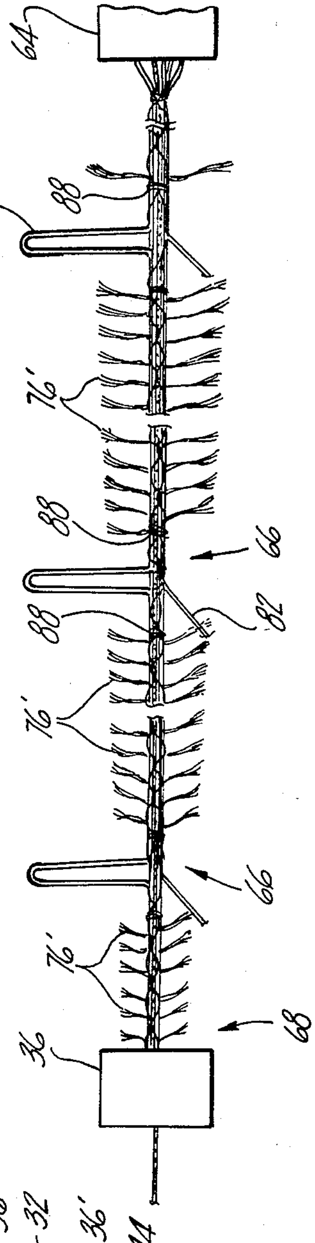
Fig-5
Fig-2
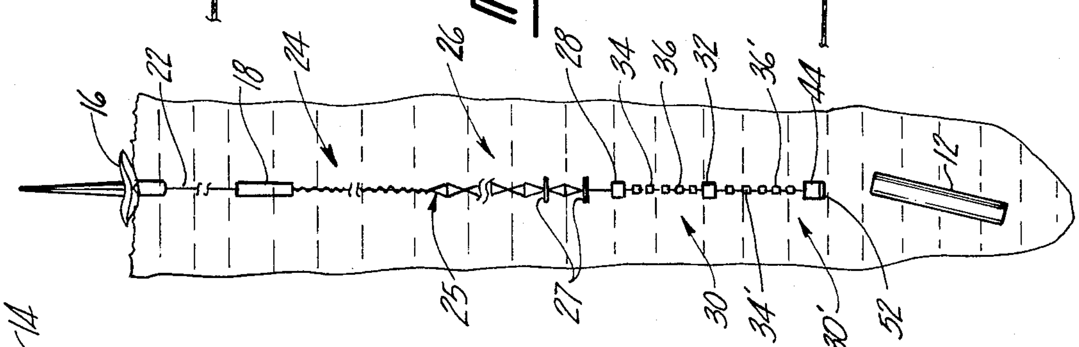
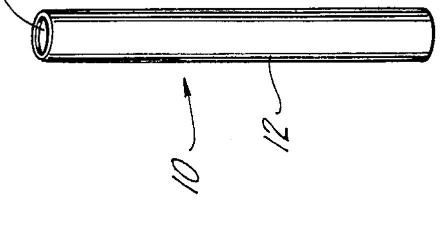
Fig-1

TAPERED WIRING HARNESS

FIELD OF THE INVENTION

This invention relates to wiring harnesses and more particularly it relates to a tapered wiring harness wherein the number of conductors in the harness assembly diminishes from one end to the other. The invention is especially adapted for use in an underwater wiring harness for an array of hydrophones in a sonobuoy.

BACKGROUND OF THE INVENTION

This invention was made in an effort to overcome certain disadvantages in the wiring harness of a sonobuoy, i.e. an array of hydrophones in an underwater sonic detection system. While the invention is especially useful in such systems, it may also find use in other applications. In sonobuoys it is common practice to deploy an array of hydrophones in a suspended arrangement from a single flotation device. A wiring harness with multiple tap points is suspended from the flotation device and the number of wires in the harness diminishes from the upper end to the lower end with a hydrophone connected to the lower end of each of the wires. This type of sonobuoy is sometimes referred to as a vertical line array and the wiring harness is known as a tapered harness because of the diminishing number of wires.

The wiring harness for a tapered array must have the attributes of high strength, small size and light weight. The strength is required to support the ballast which tends to keep the harness vertical in the water and light weight is desired to minimize the load on the suspension system. A compact, circular cross-section of the harness is desirable to minimize the lateral drag forces due to currents in the water which induce motion of the harness.

It is known that acoustic noise is generated by flow currents around the wiring harness. The magnitude of the noise increases with the diameter of the harness and with other factors. The shedding of vortices indirectly produces the acoustic noise. It is known that hairing on the harness will reduce the noise by inhibiting the formation of vortices in the flow around the harness. Hairing is made up of a multiplicity of hairing members, each comprising a length of multifilament thread, spaced along the harness. An increased amount of hairing, i.e. closer spacing of hairing members, for increased diameter of the harness will reduce the noise but it also increases the drag on the cable due to current flow. This additional drag is undesirable since it will distort the shape and the attitude of the acoustic array. This distortion has a deleterious effect on the beam pattern formed by the hydrophones fastened along the length of the harness.

A general object of this invention is to overcome certain disadvantages of tapered wiring harnesses for underwater acoustic arrays of the prior art.

SUMMARY OF THE INVENTION

In accordance with this invention, there is provided a tapered wiring harness which is of small diameter, light weight, rugged construction and of low manufacturing cost. Further, the wiring harness is effective to reduce extraneous acoustic noise due to fluid flow while minimizing the drag resulting from the fluid flow.

According to the invention, a wiring harness is provided which comprises a plurality of wires of different length disposed in a bundle with a lacing of thread encircling the bundle and holding the wires together in a substantially circular cross-section. The terminal end of each wire extends outside the lacing for connection to an electrical device. The lacing of the threads is in a stitch pattern of the zig zag type with the threads under substantially uniform tension throughout the length of the bundle for holding the wires in close engagement with each other. For reinforcement purposes, a plurality of the stitches are contiguous to each other at each location where a wire extends from the bundle outside the lacing.

Further, according to the invention, the wiring harness for an array of acoustic transducers comprises a plurality of signal wires of different length disposed in a bundle with the starting ends approximately even and the terminal ends being staggered. A common wire is disposed in the bundle and a lacing of thread encircles the bundle for holding the wires together. The terminal end of each signal wire is outside said lacing for connection with the transducer at a take-out point. Also, a loop of the common wire is outside the lacing at each take-out point for connection with the transducer. Hairing is provided on the bundle to inhibit the formation of vortices. Further, the bundle includes a strain cord extending throughout the length of the bundle and adapted to be connected with a ballast at the terminal end. Further, according to the invention the density of the hairing on the bundle is greater on portions thereof containing a larger number of wires than it is on portions of the bundle containing fewer number of wires.

A more complete understanding of this invention may be obtained from the detailed description that follows taken with the accompanying drawings.

DESCRIPTION OF THE DRAWINGS

FIG. 1 shows a perspective view of a typical sonobuoy in which this invention may be used;

FIG. 2 shows the sonobuoy including the wiring harness of this invention deployed in the water in an operational condition;

FIG. 3 shows the wiring harness of this invention with a transducer connected to one of the take-out points;

FIG. 4 is a view taken on lines 4—4 of FIG. 3; and

FIG. 5 shows an additional embodiment of the wiring harness.

BEST MODE FOR CARRYING OUT THE INVENTION

Referring now to the drawings, there is shown an illustrative embodiment of the invention in a wiring harness for a sonobuoy. It will be understood, as the description proceeds, that the wiring harness of this invention is adapted for other applications and that the invention may be realized in various other embodiments.

Prior to describing the wiring harness of this invention, it will be helpful to consider the application of the harness in its exemplary use in a sonobuoy. FIG. 1 shows a sonobuoy of the type which is adapted to be dropped from an aircraft into the ocean for use, for example, in detecting the presence of submarines or other underwater objects. In general, the sonobuoy 10 comprises an outer housing or casing 12 which contains the components of the sonobuoy, including the wiring harness of this invention. The upper end of the sonobuoy 10 contains a parachute for restraining the fall of the sonobuoy toward the water when it is air dropped. A cover 14 is removed by a shock cord when the sonobuoy is air dropped from the aircraft and the parachute is released. When the sonobuoy hits the water the parachute is detached and the deployment of the sonobuoy components in the water is initiated.

The sonobuoy in its deployed condition in the water is illustrated in FIG. 2. A float 16, which sustains the deployed sonobuoy relative to the surface, comprises an inflated envelope. The float is inflated by a cylinder of pressurized gas which is released by an actuator, such as a sea water battery activated explosive squib, when the sonobuoy contacts the sea water. The float 16 carries a radio transmitter and may also carry a battery pack for the electronic power supply of the sonobuoy. A suspension stowage housing 18 is carried below the float 16 by a main cable 22. The main cable 22 includes electronic signal conductors for electrical connection between the electronics components in the float 16 and the electronics components deployed at a lower level. The main cable may be of a length ranging, for example, from sixty feet to one thousand feet depending upon the particular application of the sonobuoy.

A suspension system comprises a compliant section 24 and a drogue or sea anchor 26. The purpose of the suspension system is to attenuate the vertical motion imparted to the hydrophones of the sonobuoy as a result of surface waves and to minimize the lateral oscillation produced by periodic vortex shedding in underwater currents. Both vertical motion and lateral motion of the hydrophones tends to produce undesired spurious hydrophone signals. The compliant section 24 comprises an elastic supporting line with a signal cable loosely coiled thereon in a known construction and extending between the stowage housing 18 and the upper end of the sea anchor 26. The sea anchor 26 comprises a set of kites 25 and disk dampers 27 of known construction.

A wiring harness stowage spool 28 is connected to the lower end of the sea anchor 26 and an upper hydrophone array 30 extends therefrom to an electronics can 32. The upper hydrophone array 30 comprises a tapered wiring harness 34 and a plurality of transducers or hydrophones 36 connected therewith in spaced relation along the wiring harness. A lower hydrophone array 30′ extends between the electronics can 32 and a wiring harness stowage spool 44. The lower hydrophone array 30′ is similar to array 30 and comprises a tapered wiring harness 34′ and a plurality of hydrophones 36′ connected therewith. A ballast 52 is mounted on or connected with the stowage spool 44. In deployment of the sonobuoy, the casing 12 is detached from and falls away from the deployed components of the sonobuoy.

The tapered wiring harnesses 34 and 34′ of FIG. 2 are of the same construction. The construction will be described with reference to wiring harness 34 as shown in FIGS. 3 and 4.

The wiring harness 34 comprises, in general, a plurality of electrical conductors 62 extending from a terminal connector 64 through a plurality of junctions or transducer take-out points 66 to a final take-out point 68. A separate take-out point is provided for each hydrophone to be connected to the harness. The conductors 62, along with a strain cord 72 are held in a cable or bundle by a lacing 74. Additionally, hairing members 76 are held to the bundle by the lacing.

In the wiring harness 34, the electrical conductors 62 include a set of signal wires 82. In the illustrative embodiment there are a total of five signal wires to accommodate five hydrophones 36 (only four take-out points are shown in FIG. 3 because of the drawing discontinuity). Each of the five signal wires 82 extends to a different one of the take-out points 66 and 68 and terminates thereat in a free end. Thus, the signal wires are of successively different lengths, and the last of the signal wires extends to the final take-out point 68. A common or ground wire 84 extends from the connector terminal 64 throughout the length of the wiring harness 34; it is provided with a take-out loop 86 at each of the take-out points 66 except for the final take-out point at which it terminates in a free end. The strain cord 72 also extends from the terminal connector 64 throughout the length of the cable and terminates in a free end beyond the final take-out point 66 and the free end is connected with the spool 44 which carries the ballast 52. The strain cord 72 comprises an organic fiber of high tensile strength; preferably, it is made of a material sold under the trademark "KEVLAR" by the DuPont Company of Wilmington, Del. This material enables the required strength to be achieved with a relatively small diameter strain cord so that the circular cross-section of the harness is minimized and thus a minimum drag force is caused by current flow.

The electrical conductors 62, including the signal wires 82 and the common wire 84 together with the strain cord 72 are held in a bundle by the lacing 74. The lacing 74 is a standard lock stitch of zig zag pattern and is suitably produced by a conventional sewing machine. It will be understood that a chain stitch of zig zag pattern may also be used. The lacing is made with a thread, suitably of multifilament nylon, with the stitches being formed under tension to hold the bundle tightly together in a generally circular cross-section. The lock stitch, as illustrated, is formed by two threads one of which is a needle thread and the other a bobbin thread. The sewing machine is suitably equipped with a conventional swing needle for producing a zig zag stitch and the width of the zig zag is set corresponding to the width of the bundle. The needle thread is carried past the bundle and the loop it forms is caught by the hook on a rotating bobbin and looped around the bobbin thread. When the needle is withdrawn, the intersection of the threads is pulled alongside the bundle. From each such intersection the individual threads cross over the bundle to another intersection in a lock stitch pattern. Tension is maintained on the threads by the action of the pressure plates of the machine after the take-up lever pulls the needle thread off the hook of the bobbin.

In the lacing, the length of the stitches is adjusted or varied along the length of the harness as desired. Stitch length is suitably correlated with the spacing of hairing members, as will be discussed subsequently. In order to provide reinforcement of the binding at the take-out points 66, the lacing is provided with bar tacks 88 at opposite ends of each take-out point. The bar tacks 88 are formed by a plurality of overlaid stitches, i.e. the stitch length is substantially zero for a predetermined number of stitches. Further, the length of the stitching is adjusted so that there is a minimum number of stitches between the bar tacks 88 of a given take-out point 66. This lacing structure facilitates water tight sealing of the hydrophone connections, as will be discussed presently.

In order to reduce the acoustic noise generated by flow currents around the harness, hairing is provided on the harness to prevent the formation of vortices. The hairing is made up of a multiplicity of hairing members 76 each of which comprises a multifilament thread, suitably nylon. It is known that the shedding of vortices indirectly produces unwanted acoustic noise. The magnitude of the acoustic noise generated by flow currents increases with the diameter of the harness and with other factors. In order to optimize the relationship of drag and vortex shedding, the "hairing density" is varied along the length of the harness in accordance with the diameter of the bundle of conductors. As used herein, the term "hairing density" means the sum of the lengths of the hairing members disposed within a given length of the harness.

The hairing members 76 are secured to the harness by inclusion of the fibers between the lacing 74 and the bundle of electrical conductors 62. All of the hairing members 76 are substantially the same length, typically on the order of three fourths of an inch, and each member, at the point of attachment by the lacing, extends substantially transversely of the bundle of electrical conductors. The hairing members are spaced more closely together on the harness where the bundle diameter is larger and are spaced less closely together where the bundle diameter is smaller. For example, at the larger diameter where the bundle includes six wires and the strain cord, the spacing of the hairing members may be about five members per inch whereas at the smaller diameter with one wire and the strain cord the spacing may be one member per inch. Variation in hairing density in the manner described minimizes the drag imposed by the hairing members on the harness while achieving a maximum reduction of vortices and thus the acoustic noise generated by flow currents around the harness is minimized. In order to achieve the desired spacing of the hairing members, the spacing of the hairing members and the length of the hairing members may be correlated with the length of the stitches in the lacing. For example, with a given stitch length and given length of hairing members, a hairing member may be placed under every second stitch. The different spacing could be obtained by a shorter stitch length with a hairing member placed under every third stitch. If desired, a variable stitch length may be used along the length of the wiring harness to achieve the desired spacing of hairing members of a given length.

Each of the hydrophones 36 is electrically connected to the harness 34 at a take-out point. For this purpose, the free end of the signal wire 82 at the take-out point is stripped of insulation and connected with the hydrophone and similarly the common wire loop 86 is stripped and connected with the hydrophone. To provide electrical insulation, the electrical connections are encapsulated by a potting compound. FIG. 3 shows a hydrophone connection in which the wire bundle of the harness extends through the hydrophone casing and the electrical connections of the signal and common wires are made inside the casing and covered with potting compound. This arrangement provides both mechanical and electrical connection of the hydrophone with the harness. The potting compound provides electrical insulation and a watertight seal. To avoid impairment of the watertight seal the stitch length in the lacing on the bundle is long enough between bar tacks at each take-out point so that a minimum number of stitches are included in the region which is encapsulated by the potting compound.

An additional embodiment of the invention is shown in FIG. 5. Hairing density is varied with uniform spacing of hairing members by using hairing members of variable length. The embodiment of FIG. 5 is the same as that described with reference to FIGS. 1 through 4 except as follows. The hairing members 76' are uniformly spaced along the length of the wiring harness. For example, the spacing is three hairing members per inch. Variable density is achieved by varying the length of the hairing members such that longer members are used on that portion of the wire bundle containing a larger number of wires and shorter members are used on those portions of the bundle containing a fewer number of wires. For example, in the illustrative embodiment a length of the hairing members may range from a maximum of one and one-half inches to a minimum of one-half inch. Variation of the hairing density in the manner described minimizes the drag imposed by the hairing fibers on the harness for achieving a maximum reduction of vortices.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. A wiring harness for an array of electrical transducers comprising:

a plurality of signal wires of different lengths and being disposed in a bundle with the starting ends being approximately even and the terminal ends being staggered, a common wire in said bundle, a lacing of thread encircling said bundle for holding said wires together, the end of each signal wire being outside said lacing for connection with a transducer at a take-out point, a loop of said common wire being outside said lacing at each take-out point for connection with said transducer, and hairing on said harness comprising multiple hairing members retained on said bundle by said lacing at a predetermined intervals.

2. The invention as defined in claim 1 wherein said bundle includes a strain cord extending throughout the length of said bundle and adapted to be connected with a ballast at the terminal end.

3. The invention as defined in claim 1 wherein said hairing members are of uniform length and are more closely spaced along said bundle on portions thereof containing a larger number of wires and are more widely spaced on portions of said bundle containing fewer number of wires.

4. The invention as defined in claim 1 wherein said hairing members are uniformly spaced along said bundle and have a greater length on portions of said bundle containing a larger number of wires and have a shorter length on portions of said bundle containing a fewer number of wires.

5. The invention as defined in claim 1 wherein said lacing is a stitch of the zig zag type.

6. The invention as defined in claim 5 wherein the spacing of said stitches is varied along a length of said bundle.

7. The invention as defined in claim 5 wherein in a plurality of stitches are placed contiguous to each other to form bar tacks on either side of each of said take-out points.

8. A tapered wiring harness for a vertical array of underwater acoustical hydrophones, said harness comprising:

a plurality of wires of different lengths and disposed in a bundle with the starting ends being approximately even and the terminal ends being staggered, and a lacing which comprises only one pair of threads encircled said bundle for holding said wires together in a bundle which is approximately circular in cross-section, the terminal end of each wire being removed from said bundle at a take-out point and being outside said lacing, said pair of threads being interlaced with spaced loops around each other and with alternate loops being on opposite sides of said bundle, said threads being under substantially uniform tension throughout the length of said bundle for holding said wires in close engagement with each other, said loops being contiguous to each other to form a bar tack on either side of and adjacent to each take-out point, said loops being spaced apart along the length of said bundle between said bar tacks.

9. The invention as defined in claim 8 wherein the spacing of said loops between said bar tacks is varied along the length of said bundle.

10. The invention as defined in claim 1 wherein the hairing density varies directly along the length of said harness with the variation in the diameter of the bundle of wires.

* * * * *